May 6, 1958
R. J. STANTON ET AL
2,833,910
TUBE WELDING
Filed March 14, 1956
2 Sheets-Sheet 1
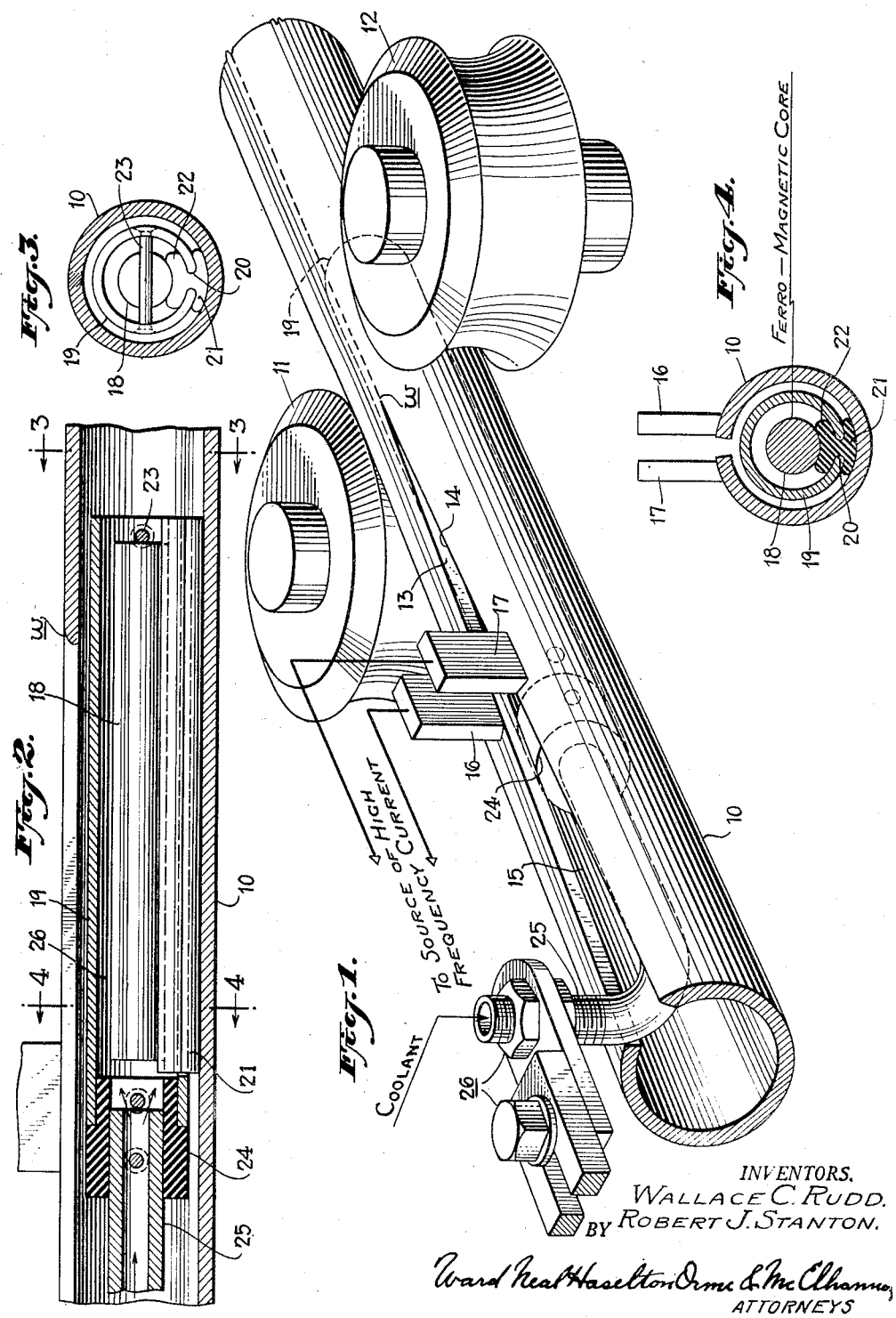
INVENTORS.
WALLACE C. RUDD.
BY ROBERT J. STANTON.
Ward Neal Haselton Orme & McElhanny
ATTORNEYS

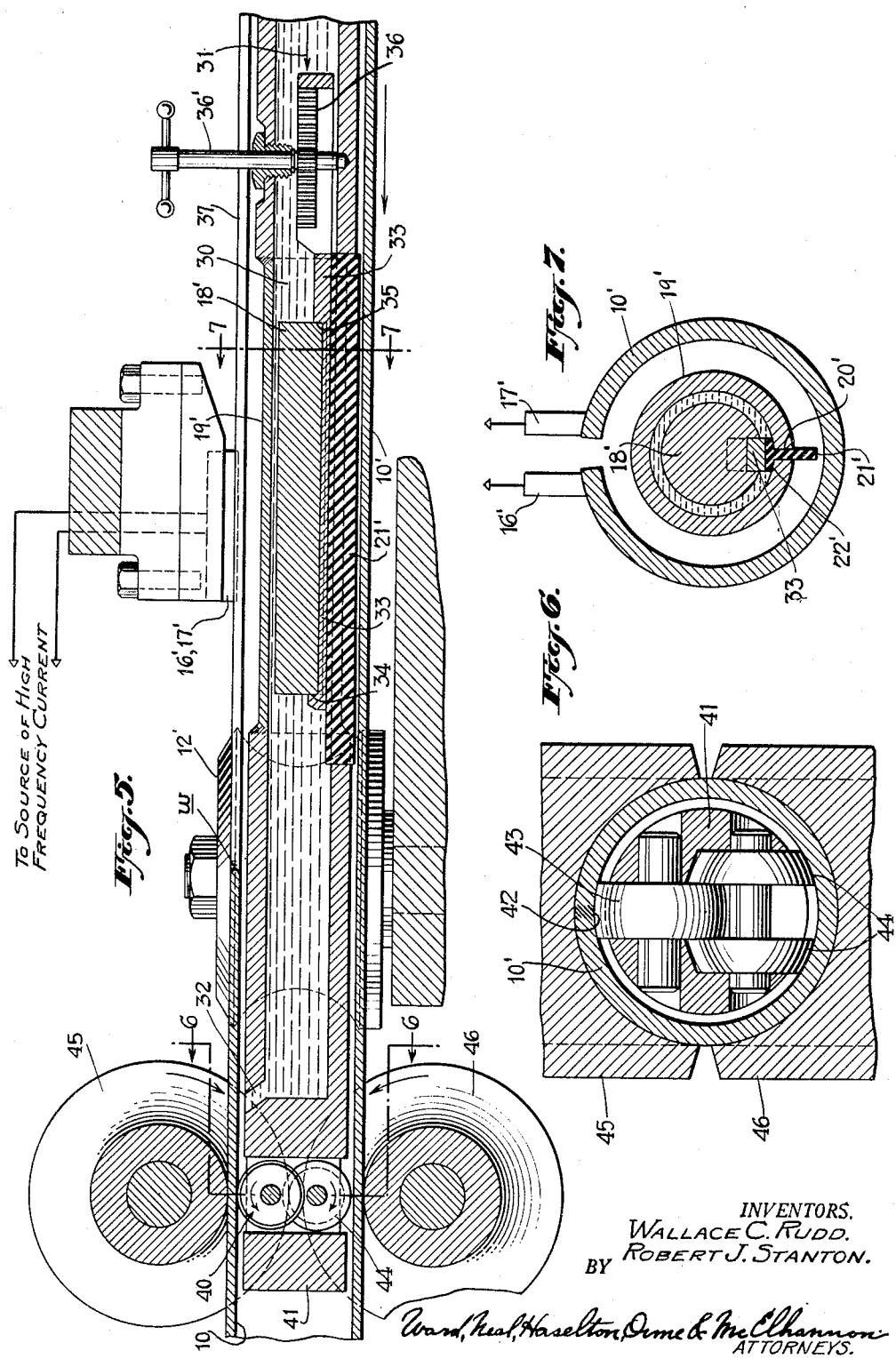

United States Patent Office 2,833,910
Patented May 6, 1958

2,833,910

TUBE WELDING

Robert J. Stanton, Brooklyn, and Wallace C. Rudd, Larchmont, N. Y., assignors to Magnetic Heating Corp., New Rochelle, N. Y., a corporation of New York Application March 14, 1956, Serial No. 592,702

9 Claims. (Cl. 219—59)

This invention relates to methods and apparatus for welding by the use of high frequency electrical heating and more particularly among other possible uses for continuously welding a longitudinal seam in metal tubing.

Reference is made to the co-pending application of Wallace C. Rudd and Robert J. Stanton, Serial No. 421,768, filed April 8, 1954, and to their preceding application Serial No. 332,422, filed January 21, 1953 (now abandoned), the subject matter of said applications being disclosed also in Belgian Patent No. 530,877, granted August 31, 1954. Said applications and said patent disclose a method and means for welding together the edges defining the longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point. The present invention involves improvements upon the features of such method and apparatus.

As pointed out in our above-mentioned prior disclosures, in some cases, particularly if the tube diameter is relatively small, there will, however, be a tendency for at least some part of the current to flow circumferentially around the tube instead of along the edges of the V-shaped gap and there may be a tendency for the weld point to vary its position along the direction of travel of the tube with consequent loss of efficiency and irregularities in the weld. As further pointed out in said prior disclosures, these difficulties may be minimized by increasing the impedance of the current path from one of the contacts circumferentially around the tubing to the other, by mounting within the tubing or adjacent thereto magnetic core means or the like, with the result that this increased impedance of this path causes the radio high frequency current still further to be concentrated where it is desired along the V-shaped gap edges and also the position of the small arc which occurs at the weld point becomes more dependably stabilized at a fixed point. The possible speed of welding of the tubing may therefore be greatly increased and the quality and uniformity of the weld may be improved.

As we have heretofore disclosed, the magnetic core means used is preferably comprised for example of rods of sintered magnetic oxide insulation material, of known types which have a low loss factor, high volume resistivity, and a permeability preferably substantially greater than unity, for example such as the material marketed under the trade name "Ferramic" by General Ceramics & Steatite Corp. This material is a non-electrical conductor and has a Curie point in the range of about 200° to 300° F. However, since the heated tube edges and the arc at the weld point will come very close to such material, particularly if the tube diameter is small, sufficient radiant heat may reach such core material either to cause same to crack or to raise its temperature above the Curie point temperature, so that it ceases properly to function.

However, in accordance with the present invention, we have found that these problems may be satisfactorily overcome by surrounding the magnetic core material by suitable container means such as copper tubing, which in turn is mounted within the advancing tube being welded and which container means also preferably is arranged to be continuously fluid cooled.

Various further and more specific objects, features and advantages of the invention will appear from the description given below, taken in connection with the accompanying drawings, illustrating by way of example certain preferred forms of the invention.

In the drawings:

Fig. 1 is a somewhat schematic perspective view of one form of the invention;

Fig. 2 is a longitudinal sectional view taken on a vertical plane through the arrangement of Fig. 1;

Figs. 3 and 4 respectively are transverse sectional views taken substantially along lines 3—3 and 4—4 of Fig. 2;

Fig. 5 is a longitudinal sectional view of an alternative arrangement of apparatus embodying the invention; and Figs. 6 and 7 respectively are transverse sectional views taken substantially along lines 6—6 and 7—7 of Fig. 5.

Referring to the drawings in further detail, the tube which is to be welded is indicated at 10 advancing in the direction of the arrow shown through a tube mill which may include a pair of pressure applying rollers as at 11 and 12 which engage opposite sides of the tubing near the region of the weld point w and so that the opposite edges 13 and 14 within the V-shaped gap 15 are firmly brought together. The contacts or electrodes by which the radio frequency current is applied to the gap edges are indicated at 16 and 17, these preferably being fluid-cooled as shown in the above-mentioned previous disclosures and being located slidably to engage at or adjacent the gap edges a suitable distance in advance of the weld point. As disclosed in our said application Serial No. 421,768, the frequency of the current used preferably is of the order of 100,000 cycles per second or higher, for example 300,000 to 500,000.

While with the apparatus as shown in Fig. 1, the V-shaped gap in the tubing is indicated as extending along the upper side of the tubing, it will be understood that this is for convenience of showing only and that the gap might be at other places, either at one side or along the bottom of the tubing, and in construing the appended claims, such other possibilities should be considered as coming within the scope of the invention.

Referring now to the drawings in further detail, one of the rods of magnetic core material is indicated at 18 mounted within a tubular metal container as at 19 for example, formed of copper tubing and being preferably, although not necessarily, slitted along one side as at 20 to prevent the circumferential flow of high frequency induced current therein. The tube 19 may rest upon a strip of suitable insulation material as at 21, and if the tube is slit, such insulation material may, as shown, extend up through the slot and be shaped also to provide a support 22 for and extending along beneath the core rod 18. Suitable means such as a pin 23 may extend through the end of the container 19 for preventing the core rod from sliding out.

As best shown in Fig. 2, the left hand end of the container 19 may comprise a suitable insulation connecting member 24, which brings a conduit 25 for cooling fluid into communication with the container 19. The conduit 25 may, as shown in Fig. 1, constitute a support for the rod of magnetic core material and its container. As further indicated in Fig. 1, the conduit 25 may be carried by a suitable adjustable supporting bracket means as at 26, permitting adjustment of the position of the core and its container both longitudinally of the tubing 10, as well as vertically with respect to the gap 15.

Cooling fluid such as water may be supplied to the conduit 25 to flow therethrough and through the container 19 in the clearance space 26 therein provided around the rod 18 and thence out the right hand end of the container, the cooling fluid therefrom being carried away in the tubing 10. Thus the rod of magnetic core material 18, as well as its container 19, are kept from being damaged by overheating and there will accordingly be no danger that the core material will reach or exceed the Curie point during continuous operation of the apparatus. It has been found that the use of such core material with this method of high frequency resistance welding is quite important for successfully welding tubing of relatively small diameters and makes possible for example the easy, uniform and dependable welding of aluminum tubing of diameters as small as 5/8" for example and at speeds in the range of from 200 to 400 feet per minute. So far as known, it has not heretofore been possible to weld small tubing of this nature by any comparable methods or at speeds even approaching such rapidity.

With the above-described apparatus, one may readily control the amount of heat at the weld point by moving the magnetic core longitudinally with respect to the position of the contacts and the welding point. Furthermore, by placement and positioning of the core, one may readily control the amount of internal upset of metal at the weld in the tubing being welded. That is, assuming that the metal has some substantial thickness along the edges to be welded, and if the current is "crowded" up to a position to flow more along the upper portion of said edge than along the lower portion nearest the inside of the tube, then the upper portion will be heated and thus softened somewhat more than the lower portion of the edge and the upset on the welded seam will tend to be more along the outer or upper side of the welded seam than internally of the tube. It will be apparent that such upward crowding of the current path may be accomplished by bringing the magnetic core body up closer to the line of the desired welded seam, thereby increasing the reactance of the high frequency current paths along the lower portion of the thickness of the metal at the gap. The most desirable adjustment of the position of the core in this respect may vary for tubing of different metals and of different thicknesses and may be determined by trial. On thin-walled steel tubing in particular, the invention makes possible a complete weld of the opposed gap surface edges without causing any broad heat pattern along such edges.

The embodiment of the invention shown in Fig. 5 provides an arrangement having the advantages of the above-described embodiment and at the same time also permitting adjustment of the longitudinal position of the magnetic core element while retaining the supporting means therefor in stationary position and at the same time utilizing such supporting means further on beyond the weld point in the tube for retaining scarfing means in position in the tube to smooth out any irregularities about the underside of the weld.

Thus in Fig. 5 the tube indicated at 10 and 10' is shown being longitudinally advanced in the same way as the tube 10 of Fig. 1. One of the two pressure rollers is here shown at 12', the weld point is indicated at $w$ and the high frequency contacts are indicated at 16', 17'. The ferromagnetic core element is indicated at 18' within a container 19' which extends back to a suitable point of support (not shown) at the right hand side of Fig. 5. This container 19' may be formed of non-magnetic metal such as copper or stainless steel and has an internal cavity as at 30 adapted to receive a flow of cooling fluid coming in from a suitable source and running in the direction of the arrow indicated at 31. Such cooling fluid passes on in the cavity 30 to the left hand end thereof and may escape as through an outlet 32 and thence on beyond into the tube 10'.

As best shown in Fig. 7, the container tube 19' along one side may be slit and the slit filled with an insulating strip such as of nylon as indicated at 21', thereby preventing circumferential flow of induced currents around in the portions of the container tube 19' in the general vicinity of the contacts 16', 17'. As indicated the upper side of the strip 21' may be formed with a supporting area 22' upon which a carriage member 33 for the magnetic core element is adapted slidably to be supported. The carriage member 33 may be formed with notches as at 34, 35 for engaging the two ends respectively of the core member 18' so that when the member 33 is slid longitudinally of the tube 10' in either direction, the core member will be adjusted accordingly. Any suitable means may be provided for longitudinally adjusting the carriage member 33 from the exterior of the tubing, for example rack and pinion means as indicated at 36 having a rotatable handle 36' for the pinion extending up through the V-shaped gap 37 in the tube 10'.

Referring now to the left hand end of Fig. 5 and to Fig. 6, there is here shown a roller cluster assembly generally indicated at 40 for providing scarfing means within the tubing and mounted on an extension portion 41 of the container member 19'. For example, as indicated in Fig. 6, the inner surface of the welded area 42 may be engaged by a roller 43 which is held up into position for such engagement as by a pair of lower rollers 44, so that the roller 43 will smooth out the inner surface portions of the weld. Externally at this region, the tubing may be supported as by upper and lower pressure rollers 45 and 46.

Thus with the equipment shown in Figs. 5–7, one may adjust the position of the magnetic core means as is the case with the embodiment of Fig. 1, and at the same time the container means 19' offers in effect a mandrel-like means for holding in position the scarfing means within the tubing at a desired location beyond the weld point. Of course, various other forms of known scarfing means other than the roller cluster above described may be used, if desired, at the same location.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together the edges of a longitudinal gap in metal tubing which comprises: means for longitudinally advancing the tubing while bringing said edges together at a weld point in a narrow V-shaped formation; a pair of contacts mounted respectively to be engaged by surfaces of the metal of the tubing along opposite sides of the gap at a position shortly in advance of said point; a source of heating current of a frequency of the order of 100,000 cycles per second or higher and having its terminals connected to said contacts respectively, whereby such current will follow a path from one of said contacts along one edge of the gap to said welding point and back along the opposite edge of the gap to the other contact; core means and means for mounting same inside the tubing for increasing the reactance of current paths extending between said contacts circumferentially of the tubing, such core means comprising a ferromagnetic but substantially an insulating mass extending along below the region of said V-shaped formation; tubular means mounted in conjunction with said core means and providing a container therefor; and means for providing a flow of cooling fluid through said container for maintaining said core means at a temperature below its Curie point.

2. Apparatus in accordance with claim 1 and in which supporting means for said core means and its container is provided which extends back to the side of the contacts opposite from the weld point and which supporting means includes parts permitting adjustment of the position of the core means with respect to said V-shaped formation.

3. Apparatus in accordance with claim 1 and in which the containing means for the core means comprises a length of metal tubing formed with a slit along one side to prevent the free flow in circumferential directions therein of high frequency current induced therein.

4. Apparatus in accordance with claim 1 and in which the containing means for the core means is supported on a conduit extending into the tubing for conducting the cooling fluid into the containing means.

5. Apparatus for welding together the edges of a longitudinal gap in metal tubing which comprises: means for longitudinally advancing the tubing while bringing said edges together at a weld point in a narrow V-shaped formation; a pair of contacts mounted respectively to be engaged by surfaces of the metal of the tubing along opposite sides of the gap at a position shortly in advance of said point; means for connecting the terminals of a source of radio frequency heating current respectively to said contacts; means formed of magnetic core material positioned inside the tubing at a region near the approaching gap edges and said weld point, such material acting to increase the reactance of the paths of current flow between the contacts in directions around the tubing and to thereby increase the current flow along the tube edges at the V-shaped gap to and from the weld point; carriage means for supporting said core material within the tubing; means accessible from the outside of the tubing for longitudinally adjusting said carriage means and the core material thereon; a container in the tubing for supporting said carriage means and core material; and means for connecting said container to a supply of cooling fluid for running therethrough.

6. Apparatus for welding together the edges of a longitudinal gap in metal tubing which comprises: means for longitudinally advancing the tubing while bringing said edges together at a weld point in a narrow V-shaped formation; a pair of contacts mounted respectively to be engaged by surfaces of the metal of the tubing along opposite sides of the gap at a position shortly in advance of said point; means for connecting the terminals of a source of radio frequency heating current respectively to said contacts; means formed of magnetic core material positioned inside the tubing at a region near the approaching gap edges and said weld point, such material acting to increase the reactance of the paths of current flow between the contacts in directions around the tubing and to thereby increase the current flow along the tube edges at the V-shaped gap to and from the weld point; mandrel-like means within the tubing for supporting said core material; means for longitudinally adjusting the relative positions of said mandrel-like means and core material, said mandrel-like means extending beyond the weld point in the tubing; and scarfing means in the tubing mounted on such extension of the mandrel-like means.

7. Apparatus in accordance with claim 6 and in which said mandrel-like means has a longitudinal cavity connected to a source of cooling fluid for running therethrough.

8. Apparatus in accordance with claim 1 and in which said container comprises insulation material precluding induction in said container from said source of high frequency currents surrounding said core means.

9. Apparatus for welding together the edges of a longitudinal gap in metal tubing which comprises: means for longitudinally advancing the tubing while bringing said edges together at a weld point in a narrow V-shaped formation; a pair of contacts mounted respectively to be engaged by surfaces of the metal of the tubing along opposite sides of the gap at a position shortly in advance of said point; a source of heating current of a frequency of the order of 100,000 cycles per second or higher and having its terminals connected to said contacts respectively, whereby such current will follow a path from one of said contacts along one edge of the gap to said welding point and back along the opposite edge of the gap to the other contact; core means and means for mounting same inside the tubing for increasing the reactance of current paths extending between said contacts circumferentially of the tubing, such core means comprising a ferromagnetic but substantially an insulating mass extending along below the region of said V-shaped formation; scarfing means also carried in conjunction with the mounting means in a position in the tubing beyond said weld point for engaging the interior of the tube along the welded seam to smooth out upset portions of the metal; and means mounted to apply pressure externally of the tube and reacting against pressure applied by said scarfing means.

References Cited in the file of this patent

UNITED STATES PATENTS

| 2,007,167 | Jones | July 9, 1935 |
| 2,020,276 | Crawford | Nov. 5, 1935 |

FOREIGN PATENTS

| 1,095,095 | France | Dec. 15, 1954 |